Sept. 22, 1942.  W. L. KEEHN  2,296,470
RIVET ASSEMBLY
Filed Sept. 15, 1941
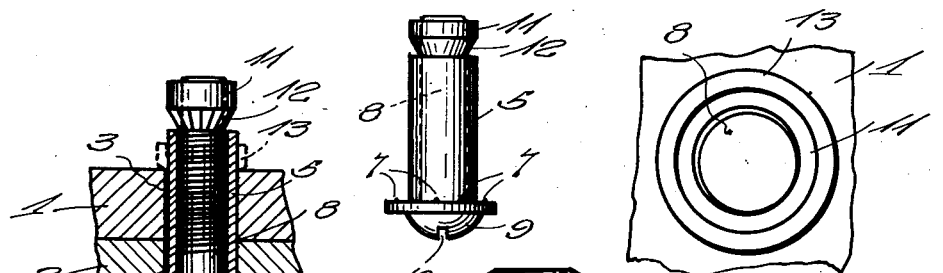
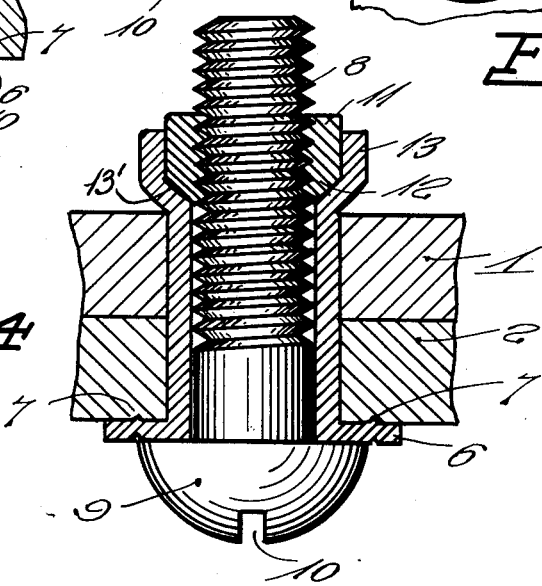
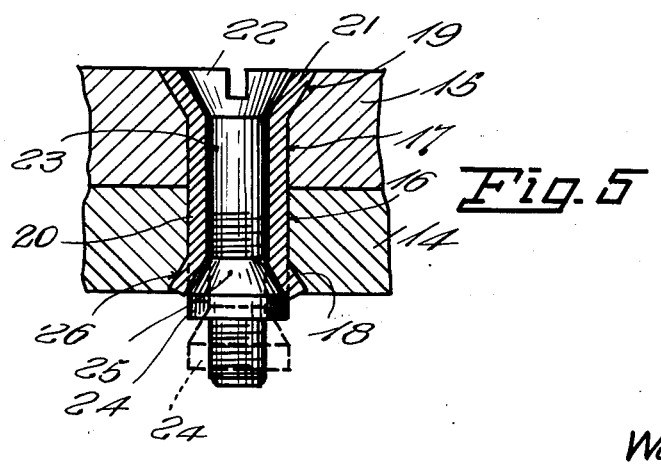
Inventor
Warner L. Keehn
By
Glenn L. Fish
Attorney Patented Sept. 22, 1942

2,296,470

UNITED STATES PATENT OFFICE 2,296,470

RIVET ASSEMBLY

Warner L. Keehn, Spokane, Wash.

Application September 15, 1941, Serial No. 410,930

1 Claim. (Cl. 85—40)

This invention relates to fasteners used for securing plates and the like in overlapped or face to face engagement with each other.

One object of the invention is to provide a rivet of such construction that it may be passed through registering openings formed through plates and end portions of a sleeve constituting an element of the rivet clinched against outer surfaces of the plates by a workman operating at one end of the rivet.

Another object of the invention is to provide a rivet wherein a bolt passes longitudinally through the sleeve with the head of the bolt bearing against a flange surrounding one end of the sleeve and the other end portion of the bolt threaded and carrying a nut serving to expand the adjacent end of the sleeve and form a collar surrounding the nut and reinforced by the nut so that it may very effectively cooperate with the flange at the first mentioned end of the sleeve to firmly hold the plates together.

Another object of the invention is to so form the nut that as the bolt is turned in a tightening direction, a tapered inner end portion of the nut will enter and spread the sleeve and form a collar or socket in which the nut has wedging fit and is frictionally held against turning. It will thus be seen that the nut cannot work loose and the bolt will be firmly held in place through the sleeve.

Another object of the invention is to provide a rivet which is simple in construction, easy to apply and very effective in operation.

In the accompanying drawing:

Fig. 1 is a side elevation of the improved rivet.

Fig. 2 is a sectional view showing the rivet passed through plates to be secured and the nut applied to the bolt.

Fig. 3 is an end view of the rivet.

Fig. 4 is a view similar to Fig. 2, showing the bolt tightened and the adjacent end of the sleeve expanded by the nut.

Fig. 5 is a sectional view showing a modified embodiment of the invention.

The bolt constituting the subject matter of this invention is employed for securing plates and the like in face to face engagement with each other and is particularly adapted for use in airplane construction, for securing plates which cannot be riveted from within a wing or other portion of the airplane. These plates I and 2 are formed with registering openings 3 and 4 of such diameter that the sleeve 5 of the rivet may be passed through the openings and have snug fit therein. This sleeve is formed of metal which is semi-soft but stiff enough to be form-retaining after being bent, expanded, or otherwise shaped. At its outer end the sleeve is formed with a circumferentially extending flange 6 which is flat and punched from its outer surface to provide spurs 7. These spurs project from the inner surface of the flange for biting engagement with the outer surface of the plate 2 to hold the sleeve against turning in the openings of the plates. The length of the sleeve is such that it will pass through the openings and protrude from the plate 1. A bolt 8 is passed through the sleeve and at one end is formed with a head 9 having a groove 10 formed therein so that a screw driver may be engaged in the groove for turning the bolt. The threaded end of the bolt protrudes from the other end of the sleeve and a nut 11 is applied thereto. This nut is of special formation and has a conical inner end portion 12 which may be smooth, as shown in Fig. 1, or ribbed longitudinally, as shown in Fig. 2. The conical inner end portion of the nut tapers to such an extent that it may enter the inner end of the sleeve and, when the bolt is turned by a screw driver engaged in the groove of the head 9, the nut will be advanced toward the sleeve and moved into the sleeve to the position shown in Fig. 4. As the nut moves into the sleeve, the inner end of the sleeve is spread to form a cup-shaped head or collar 13 into which the nut fits and the two plates 1 and 2 will be confined between the flange 6 and the abutment collar 13 and firmly clamped against each other. The spurs 7 bite into the outer face of the plate 2 and the conical end of the nut has wedging fit within the tapered portion 13' of the collar or socket 13 and the sleeve and nut will be held against turning movement during tightening of the bolt. The wedging fit of the nut will also prevent the nut from working loose after being tightened, this being particularly true when the tapered end is ribbed. If, however, it is desired to remove the rivet, the bolt may be unscrewed and withdrawn from the sleeve and the collar 13 then cut off or constricted by squeezing so that the sleeve may be withdrawn. The fact that the bolt extends through the sleeve in close fitting engagement therewith, with its head bearing against the flange 6, and the nut fills the collar, reinforces the sleeve and provides a very strong rivet.

In Fig. 5 of the drawing, there has been illustrated a modified construction wherein the plates 14 and 15 are formed with registering openings 16 and 17 having flared end portions forming seats 18 and 19. The tube or sleeve 20 passes through the registering openings and, at its outer end, is flared to form a conical seat 21 to receive the tapered head 22 of the bolt 23. The inner end portion of the sleeve or tube is initially of an even diameter but when the nut 24 is applied to the bolt and the bolt turned to advance the nut along the bolt, the tapered end portion 25 of the nut enters the inner end portion of the sleeve and expands it to form a collar 26 corresponding to the collar 13 and snugly seated within the seat 18 of the plate 14. In this embodiment of the invention, the nut and threaded end portion of the bolt protrude from the inner plate 14 but the flange or collar 21 and the head 22 of the bolt are countersunk with respect to the outer surface of the outer plate 15.

Having thus described the invention, what is claimed is:

A rivet assembly comprising a tube having continuous unbroken walls and an outstanding circumferential flange at its outer end disposed at substantially right angles thereto, the tube being initially of an even diameter from its flange to its inner end and being of a length adapting it to pass through registering openings in articles to be secured together with the flange bearing against the outer face of one article and the inner end portion of the tube protruding from the other article, a bolt passing through said tube with its head bearing against said flange, said bolt being snugly received in the tube and having its threaded end portion protruding from the inner end of the tube, and an expander nut threaded upon the protruding threaded end portion of the bolt and having a substantially frusto-conical inner end portion, the nut when moved in a tightening direction by turning of the bolt being shifted along the bolt into position for engaging within the protruding inner end portion of the tube and expanding only the protruding end portion of the tube to form a cup-shaped unbroken collar snugly receiving the nut and having its inner end portion formed with an outstanding concentric shoulder fitting snugly about the frusto-conical portion of the nut and cooperating with the flange to hold the articles tightly clamped against each other.

WARNER L. KEEHN.